R. A. STEWART.
APPARATUS FOR MAKING WHITE LEAD.
APPLICATION FILED SEPT. 9, 1913.
1,088,041.
Patented Feb. 24, 1914.
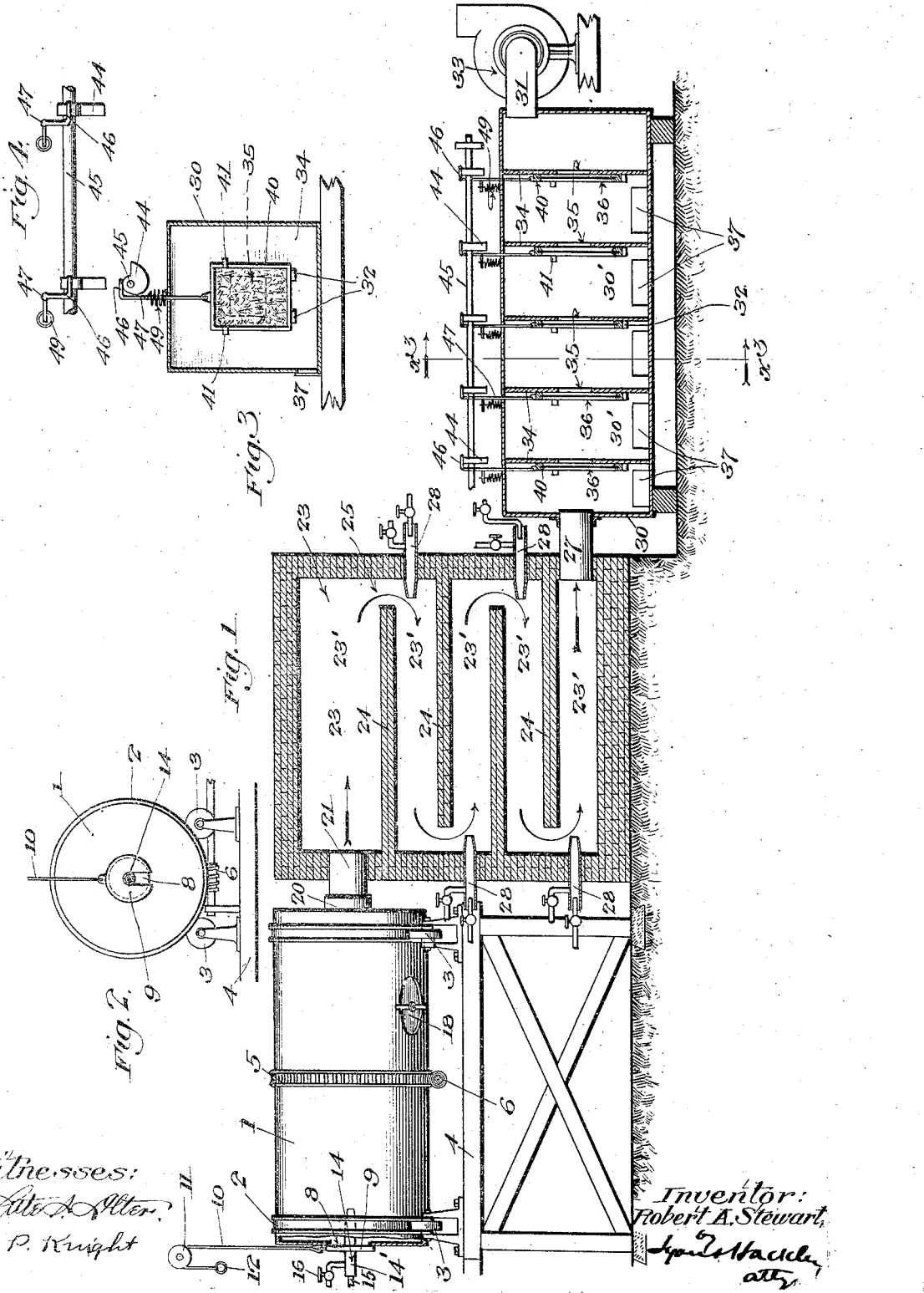
Inventor:
Robert A. Stewart,

# UNITED STATES PATENT OFFICE.

ROBERT A. STEWART, OF LOS ANGELES, CALIFORNIA.

APPARATUS FOR MAKING WHITE LEAD.

1,088,041.  Specification of Letters Patent.  Patented Feb. 24, 1914.

Application filed September 9, 1913. Serial No. 788,836.

*To all whom it may concern:*

Be it known that I, ROBERT A. STEWART, a citizen of the United States, residing at Los Angeles, in the county of Los Angeles and State of California, have invented a new and useful Apparatus for Making White Lead, of which the following is a specification.

This invention relates to an apparatus for the production of white lead pigment from lead ores, and the main object of the invention is to provide an apparatus which will produce a white commercial pigment, at one operation.

A further object of the invention is to provide means for effectively separating and recovering the produced pigment from the furnace gases.

A further object of the invention is to provide for producing the pigment in such manner that the presence of lead dust in the plant, external to the furnace, is obviated, thereby rendering the operation innocuous to the attendants.

Other objects of the invention will appear hereinafter.

The accompanying drawings illustrate an embodiment of my invention, and referring thereto:

Figure 1 is a vertical section of the apparatus with the roasting furnace partly in elevation. Fig. 2 is a front elevation of the roasting furnace. Fig. 3 is a section on line $x^2$—$x^3$ in Fig. 1. Fig. 4 is a plan view of the operating means for the shaking filters.

1 designates a roasting furnace which is preferably of the rotary type, consisting, for example, of a cylindrical drum having annular tracks 2 running on rolls 3 journaled on a frame 4, said drum having an annular worm gear 5 engaged by a worm 6 operated by any suitable means, so as to effect continual rotation of the drum. At its front end the drum 1 is provided with a charging opening 8 which is closed during the operation of the furnace by a door 9, said door being supported by operating means such as a rope 10 running over sheaves 11 and provided with a handle 12, whereby the door may be lifted when it is desired to charge the furnace. Suitable means such as an oil or gas burner 14 is provided for supplying heat to the roasting furnace to roast and volatilize the lead, said burner being adapted to supply air, together with fuel, and consisting, for example, of an air inlet tube 14', a steam supply pipe 15 opening into said tube, and an oil supply pipe 16 for delivering oil in the path of the jet of steam and air passing through said tube. By opening the door 9 more or less, a further quantity of air may be admitted during the operation of the furnace according to requirements. The drum 1 is preferably provided with means such as a man hole 18 for permitting discharge of the residue when the operation is completed. At its rear end the drum communicates by an outlet tube 20 with a pipe 21 opening into a supplementary roasting chamber 23, said chamber being formed, for example, of masonry and being provided with a series of horizontal partitions 24 extending alternately from opposite walls, so as to divide the interior of said chamber into a number of compartments 23', the uppermost compartment communicating with the pipe 21 aforesaid at one end, and with the next lower compartment through a passage 25 at its other end, and communication being provided between each compartment and the next lower compartment by similar passages 25 alternately at opposite ends, the lowermost compartment 23' communicating with an outlet pipe 27, so that the gas passing into the chamber 23 is caused to traverse a tortuous passage from the inlet pipe 21 to the outlet pipe 27.

Any desired number of the chambers 23' are provided with supplementary heating means consisting, for example, of oil burners 28 similar to the oil burner 14 above described, said burners opening into the respective chamber compartments 23' so as to direct jets of burning fuel and air into and along said chamber compartments, preferably in a direction of the flow of the gaseous and solid products therethrough.

To the outlet 27 is connected a filter chamber or casing 30, having at its end farthest from said pipe 27 an outlet pipe 31 leading to an exhaust or suction fan or blower 33 which draws a current of gases through the filter casing from the pipe 27. A series of partitions 34 are provided in the filter casing 30, extending across the same and provided with central openings 35, and movable shaking screens or filter members are supported adjacent to said openings to collect and separate the solid products from the gaseous products. The partitions 34 divide the filter chamber or casing 30 into a series of compartments 30' and normally closed doors 37 are provided at the bottom portions of these compartments for drawing off the solid products deposited therein. Each of the screens or filter members 36 consists of a sheet of suitable porous fabric, preferably woolen cloth, stretched in a frame 40 adapted to slide vertically between guides 41 on the partitions 34, stops 32 being provided for arresting the downward movements of said frames, and suitable means being provided for intermittently and periodically lifting said frames to shake the screens or filter members. Said lifting means may consist of cams 44 on a shaft 45 rotated by any suitable means, said means 44 engaging arms 46 on rods 47 which extend through the top of the casing 30 and are connected at their lower ends to the respective frames 40. A spring 49 may be provided connecting each rod 47 with the casing 30, so as to draw the rod forcibly downward in case the action of gravity is not sufficient for this purpose.

The operation is as follows: The drum 1 is charged with suitable lead ore, for example, sulfid ore and is set in rotation by its operating means 6, 5, and the door 9 being lowered, the burner 14 is set in operation, causing the ore in the drum to become roasted and volatilized, the resulting gaseous and solid products being driven off through the outlet 21 into the supplementary roasting chamber 23. By operation of the suction fan 33, the fumes or gaseous and solid products from the drum 1 are drawn continuously through the chamber 23, passing successively through the several compartments 23' thereof and in such compartments they are subjected to successive heating and roasting actions by the operation of the several burners 28. In the first operation in the drum 1, most of the lead is converted into oxid, hydrate and carbonate and any metallic lead that may be carried over by volatilization into the chamber 23 is subjected by the heating and roasting action therein to a further oxidizing and carbonizing action by being heated in the presence of the carbonic acid gas resulting from the combustion of the carbonaceous fuel at the burners 28 and of the air introduced at said burners 28. The product coming from the roasting furnace is gray or bluish by reason of the pressure of unoxidized lead particles, but in passing through the supplementary roasting chamber such particles of lead are converted into white lead, so that the product coming from the supplementary chamber is white. The rehandling and reburning necessitated with the usual apparatus are thereby dispensed with. By suitably carrying out the above described operation complete oxidization of the lead is secured by the time that the products reach the delivery end of the supplementary roasting chamber, so that the product passing through the outlet 27 to the filtering chamber consists of white lead suspended in the form of dust in the hot gaseous products of combustion. It will be understood that in the operation of the burners 14 and 28 it is necessary to so carry out the combustion that there is no smoke produced, since the presence of any free carbon would tinge the resultant white lead product. As the gaseous and solid products are drawn through the filtering chamber 30 they encounter successively the several filtering screens and filter members 36 consisting of woolen cloth which has the property of holding back or retaining the white lead particles by allowing the gas to pass through. By the operating means 44, 46 above described, the several screens or filter members 36 are given a vertical shaking or agitating motion which causes the white lead collected thereon to be shaken therefrom and to drop to the bottom of the several compartments 30', whence it may be removed from time to time through the doors 37.

Since the operation takes place wholly in closed chambers, and no rehandling of the product is required during its production, the pigment may be produced in this apparatus with a minimum amount of lead dust fumes in the air around the apparatus, thereby eliminating a serious source of danger to the persons operating the apparatus.

What I claim is:

1. An apparatus for making white lead, comprising a furnace for roasting and volatilizing the ore, a supplementary roasting chamber connected to receive the fumes from the aforesaid roasting furnace and provided with burners for performing a supplementary roasting operation upon the fumes as they pass through the said supplementary roasting chamber, and means for drawing the fumes from said roasting furnace and through said supplementary roasting chamber.

2. An apparatus for making white lead, comprising a furnace for roasting and volatilizing the ore, a supplementary roasting furnace connected to receive the fumes from the aforesaid roasting furnace and provided with burners for performing a supplementary roasting operation upon the fumes as they pass through the said supplementary roasting chamber, said supplementary roasting chamber being provided with partitions dividing it into compartments communicating with one another to form a tortuous passage, said burners being arranged to deliver burning jets of carbonaceous fuel and air into said compartments, and means for drawing the fumes from said supplementary roasting chamber.

3. An apparatus for making white lead, comprising a furnace for roasting and volatilizing the ore, a supplementary roasting furnace connected to receive the fumes from the aforesaid roasting furnace and provided with burners for performing a supplementary roasting operation upon the fumes as they pass through the said supplementary roasting chamber, said supplementary roasting chamber being provided with partitions dividing it into compartments communicating with one another to form a tortuous passage, said burners being arranged to deliver burning jets of carbonaceous fuel and air into said compartments, along the line of travel of the said fumes in said compartments.

4. In an apparatus for making white lead, comprising a furnace for volatilizing lead ore, a supplementary roasting chamber communicating with said furnace to receive the fumes therefrom and provided with burners for performing a supplementary roasting action on said ore, and a filter means communicating with said supplementary roasting chamber to receive the fumes therefrom and provided with a series of filter members interposed in the path of said fumes, and suction means connected to said filter chamber to draw the fume-carrying gases from said roasting furnace and successively through said supplementary roasting chamber and said filter chamber.

5. In an apparatus for making white lead, comprising a furnace for volatilizing lead ore, a supplementary roasting chamber communicating with said furnace to receive the fumes therefrom and provided with burners for performing a supplementary roasting action on said ore, and a filter means communicating with said supplementary roasting chamber to receive the fumes therefrom and provided with a series of filter members interposed in the path of said fumes, suction means connected to said filter chamber to draw the fume-carrying gases from said roasting furnace and successively through said supplementary roasting chamber and said filter chamber, and means for continually removing the deposited fumes from said filter members to maintain passage for the gases therethrough.

In testimony whereof, I have hereunto set my hand at Los Angeles, California, this 2nd day of September 1913.

ROBERT A. STEWART.

In presence of—
  A. P. KNIGHT,
  LORA M. BOWERS